Figure 1:
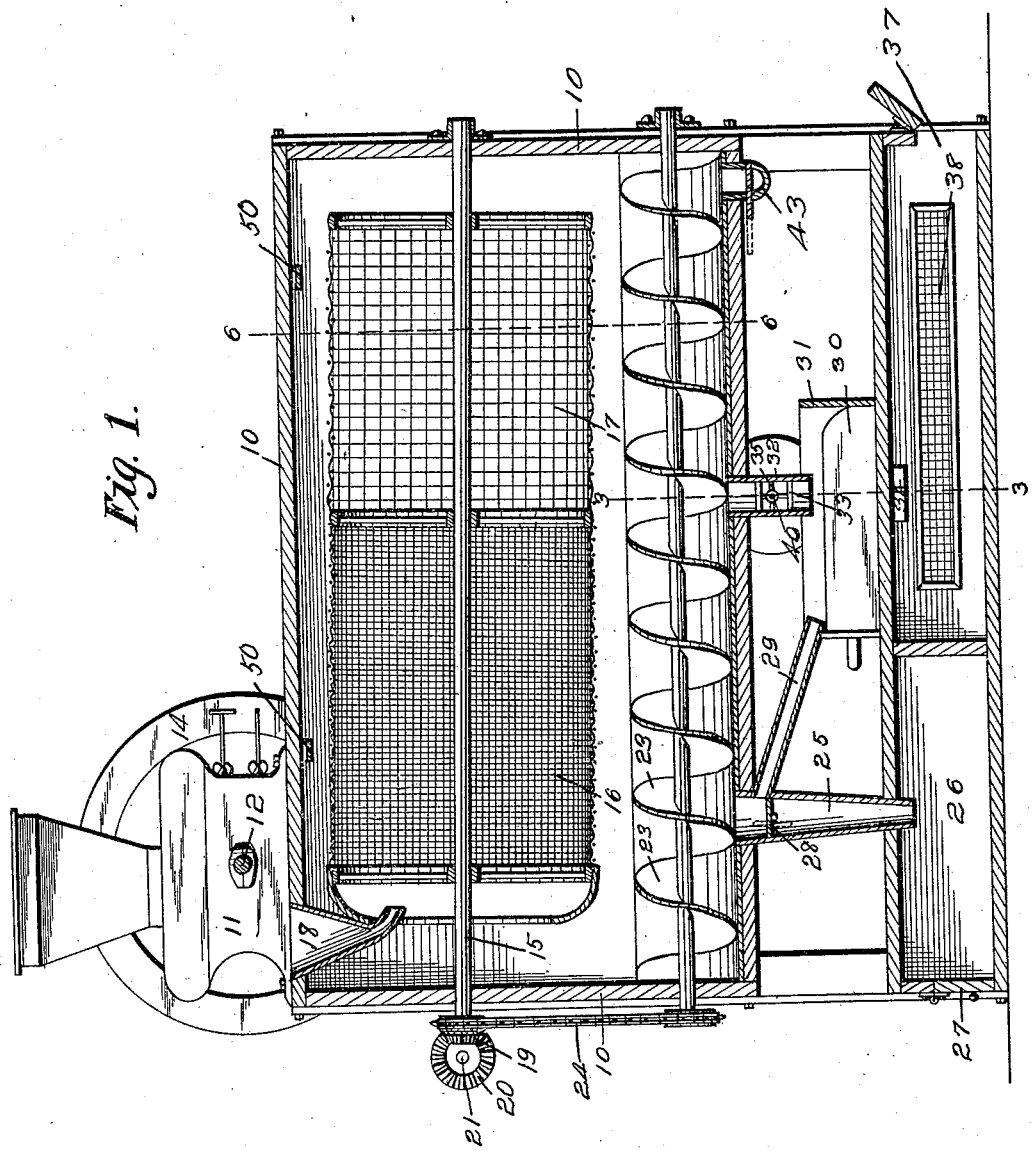

E. C. SMITH.
COFFEE CLEANING AND GRADING MACHINE.
APPLICATION FILED FEB. 14, 1908.

940,989.

Patented Nov. 23, 1909.
3 SHEETS—SHEET 1.

Witnesses:
F. C. Dahlberg.
A. G. Hague

Inventor:
Elvah C. Smith.
by Irving Lane Attys.

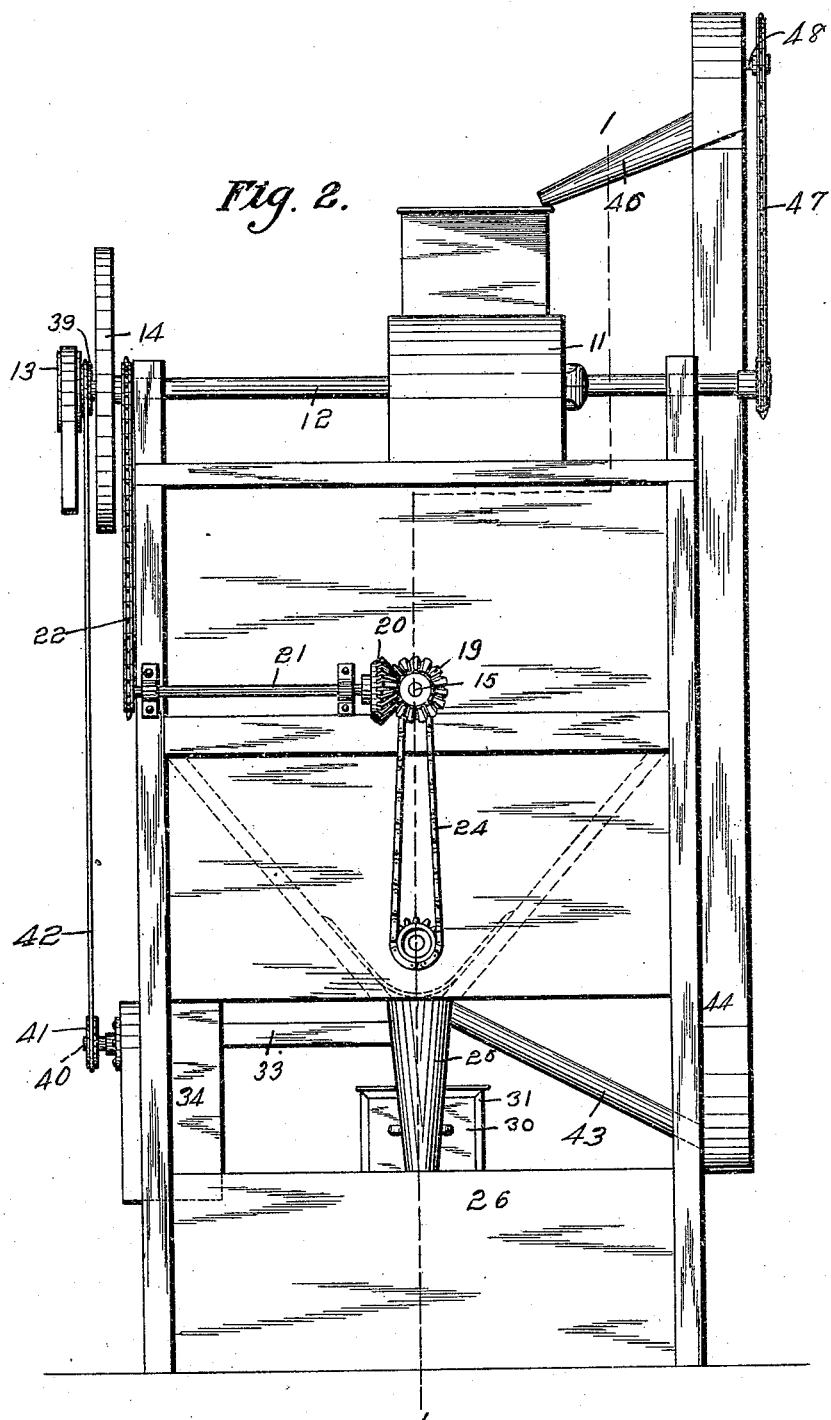

E. C. SMITH.
COFFEE CLEANING AND GRADING MACHINE.
APPLICATION FILED FEB. 14, 1908.
940,989.
Patented Nov. 23, 1909.
3 SHEETS—SHEET 3.
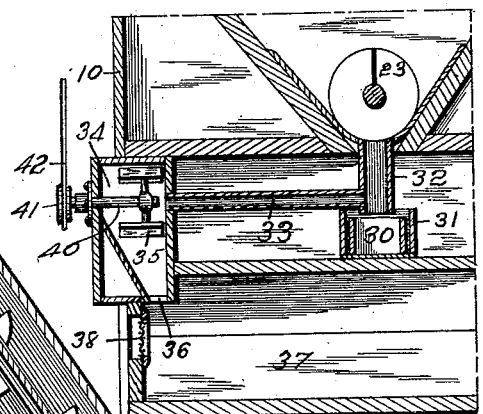

UNITED STATES PATENT OFFICE.

ELVAH C. SMITH, OF NEWTON, IOWA.

COFFEE CLEANING AND GRADING MACHINE.

940,989.  Specification of Letters Patent.  Patented Nov. 23, 1909.

Application filed February 14, 1908. Serial No. 415,954.

*To all whom it may concern:*

Be it known that I, ELVAH C. SMITH, a citizen of the United States, residing at Newton, in the county of Jasper and State of Iowa, have invented a new and useful Coffee Cleaning and Grading Machine, of which the following is a specification.

The object of my invention is to provide a device of simple, durable, and inexpensive construction, designed to quickly and thoroughly clean and grade coffee or the like, in such a manner that ground coffee passed through the machine may first have the dust and finer particles of the coffee separated into one compartment, then the ground coffee of uniform size with the dust removed from it placed in another compartment, and the ground coffee of larger size returned to a grinder for the purpose of being again run through the cleaning and separating device.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a central longitudinal sectional view taken on the line 1—1 of Fig. 2, of the complete machine embodying my invention. Fig. 2 shows an end elevation of same. Fig. 3 shows a sectional view on the line 3—3 of Fig. 1. Fig. 4 shows a detail sectional view of the conveyer. Fig. 5 shows a detail view of part of the frame, the rotary screen and the cleaning brush for same, and—Fig. 6 shows a detail sectional view on the line 6—6 of Fig. 1.

Referring to the accompanying drawings, I have used the reference numeral 10 to indicate the frame or casing of the machine.

Mounted on top of the frame 10 is a grinder 11. This grinder of itself forms no part of my present invention, and is therefore not shown nor described in detail. The grinder is operated by means of a shaft 12 having a pulley 13 thereon. The balance wheel 14 is also attached to this shaft.

Mounted within the casing 10 is a rotary screen supported upon a shaft 15, and having at one end a cylindrical screen 16 of fine mesh, and at the other end a cylindrical screen 17 of coarser mesh. The ground coffee is introduced into the end of the finer screen 16 by means of a spout 18, communicating with the grinder.

I apply power to the shaft 15 for rotating the screen as follows: Fixed to the shaft 15 is a beveled pinion 19, which pinion is in mesh with the beveled pinion 20 fixed to a shaft 21. This shaft 21 is connected by the sprocket gearing 22 with the shaft 12. Mounted below the rotary screen is a screw conveyer 23, which conveyer is operated by means of a sprocket gearing 24 connecting it with the shaft 15. Arranged below the screw conveyer is a spout 25, which spout is arranged under the receiving end portion of the fine screen 16. This spout extends downwardly into a coffee compartment 26, to which access may be had by means of the door 27.

In the spout 25 is a valve 28 arranged to prevent the discharge of coffee through the spout, and above the valve is a pipe 29 arranged to carry the coffee downwardly and toward the rear end of the machine and into an open-topped receptacle 30. This receptacle rests in an open-topped box 31. At a point directly below the end of the fine screen opposite from the receiving end, is a second spout 32 extended straight down, and designed to discharge into the receptacle 30. Communicating with this spout 32 is a pipe 33 leading to a fan casing 34, in which is a suction fan 35. The said fan casing discharges through an opening 36 into a dust receptacle 37 in the casing 10. This dust receptacle is provided with one or more screen covered openings 38 through which air may discharge and the dust be retained.

I provide for operating the fan 35 as follows: Fixed to the shaft 12 is a pulley 39 and fixed to the fan shaft 40 is a pulley 41, the pulleys 39 and 41 being connected by a belt 42.

At the rear end of the screw conveyer is a spout 43 extended downwardly and laterally into an elevator leg 44, and arranged within this elevator leg is a bucket conveyer 45 of ordinary construction, arranged to elevate coffee and discharge it through a spout 46 at its top, into the top of the grinder.

I provide for operating the bucket conveyer 45 by means of a sprocket gearing 47 connecting the upper shaft 48 of the bucket conveyer with the shaft 12.

I have also provided for cleaning the screens 16 and 17 by means of a brush 49 supported on the spring arms 50 and yieldingly held against the upper portion of the screens 16 and 17, as clearly shown in Figs.

5 and 6, so that if any coffee becomes wedged between the meshes of the screens, it will be removed therefrom by said brush.

In practical operation, and assuming that the grinding mill is discharging ground coffee through the spout 18, it is obvious that the very finely ground or powdered coffee will pass directly through the receiving end of the screen 16 and be discharged through the spout 25 into the receptacle 26. The ground coffee that is small enough to pass through the screen 16 will be carried by the screw conveyer to the spout 32 at the end of the fine screen 16, and as this coffee passes down through said spout 32, it will be subjected to an upwardly ascending air current induced by the fan 35, which will have the effect of removing all dust and very fine particles from the ground coffee, and carrying them to the dust receptacle, hence, the coffee that is finally delivered into the receptacle 30 will be of substantially uniform size, and will be free from dust and will furnish a high grade of ground coffee. All of the particles that pass through the screen 17 will be delivered by the screw conveyer into the chute 43, and will then be returned by means of the bucket conveyer to the grinder, and will be re-ground and subjected to the same treatment until all of the coffee placed in the grinder will ultimately be delivered into either the powdered coffee receptacle 26, the ground coffee receptacle 30, or the dust receptacle 37.

One of the objects of my machine is that in the event that it is desired to ultimately deposit all of the coffee introduced into the machine, except the dust, into the receptacle 30, then the valve 28 is closed, and the powdered coffee will pass through the pipe 29 into the receptacle 30, together with the ground coffee.

Having thus described my invention, what I claim and desire to secure by Letters Patent, is—

1. In a device of the class described, the combination of a casing, a rotary sieve within the casing, a screw conveyer below the rotary sieve, a screw conveyer casing, a spout leading from the screw conveyer casing at a point adjacent to the receiving end of the rotary sieve, a powdered coffee compartment to receive the discharge from said spout, a second spout leading from the screw conveyer casing below the center of the rotary screen, and a receptacle to receive the discharge from said spout, a suction fan, a casing for the suction fan, a pipe communicating between the latter spout and the fan casing, and a dust receptacle to receive the air and dust passed through the fan casing.

2. In a device of the class described, the combination of a frame or casing, a rotary screen consisting of a fine and coarse section within the frame or casing, means for discharging ground coffee into the rotary screen, a screw conveyer below the rotary screen, a spout arranged below the screw conveyer adjacent to the receiving end of the rotary screen, a powdered coffee receptacle to receive the discharge from said pipe, a second spout below the junction of the fine and coarse screen sections arranged to conduct material passed through the fine screen from the screw conveyer to the ground coffee receptacle, a pipe communicating with the latter spout, a suction fan, a fan casing communicating with said pipe, a dust receptacle having a screen covered opening therein and arranged to receive the discharge from the fan casing.

3. In a device of the class described, the combination of a frame or casing, a rotary screen consisting of a fine and a coarse section within the frame or casing, means for discharging ground coffee into the rotary screen, a screw conveyer below the rotary screen, a spout arranged below the screw conveyer adjacent to the receiving end of the rotary screen, a powdered coffee receptacle to receive the discharge from said pipe, a second spout below the junction of the fine and coarse screen sections arranged to conduct material passed through the first section of the screen from the screw conveyer to the ground coffee receptacle, a pipe communicating with the latter spout, a suction fan, a fan casing communicating with said pipe, a dust receptacle having a screen covered opening therein and arranged to receive the discharge from the fan casing, a spout communicating with the delivery end of the screw conveyer, an elevator communicating with said latter spout, a grinder arranged on top of the frame or casing, and means for discharging material from the elevator into the grinder.

Des Moines, Iowa, Jan. 8, 1908.

ELVAH C. SMITH.

Witnesses:
  RALPH ORWIG,
  S. F. CHRISTY.